May 29, 1951 H. M. JOHNSTON 2,554,741
DISK TILLER
Filed Oct. 23, 1947 4 Sheets-Sheet 2

INVENTOR.
HOWARD M. JOHNSTON
BY
ATTORNEY

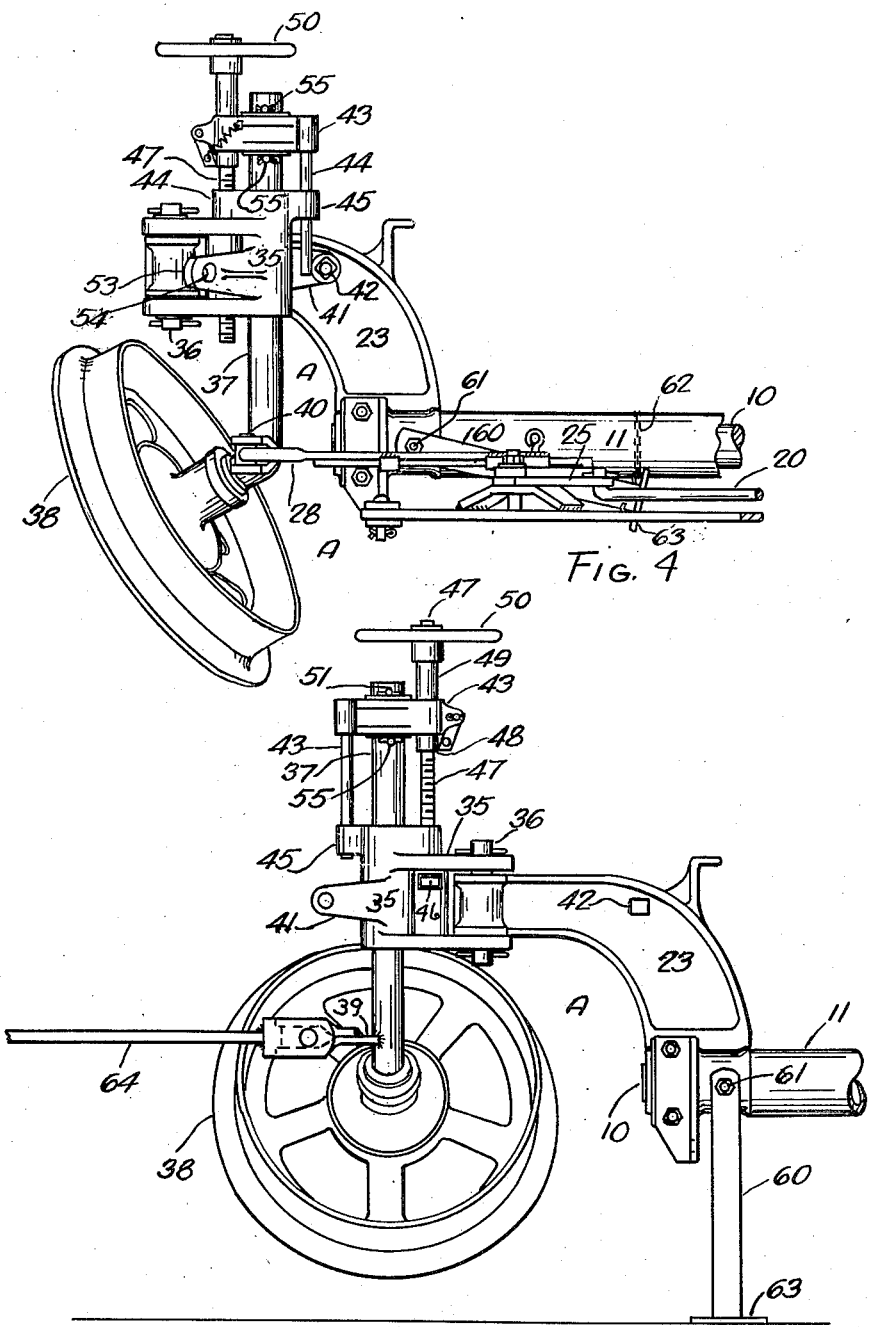

May 29, 1951 H. M. JOHNSTON 2,554,741
DISK TILLER

Filed Oct. 23, 1947 4 Sheets-Sheet 4

INVENTOR.
HOWARD M. JOHNSTON
BY　*A.S.Knob*
ATTORNEY

Patented May 29, 1951

2,554,741

UNITED STATES PATENT OFFICE 2,554,741

DISK TILLER

Howard M. Johnston, Toronto, Ontario, Canada, assignor to Massey-Harris Co. Ltd., Toronto, Ontario, Canada, a corporation of Canada Application October 23, 1947, Serial No. 781,682

5 Claims. (Cl. 97—53)

The present invention relates to a one way disc tiller, particularly adapted for larger sizes and to be tractor drawn.

The principal object of the present invention is to provide convenient means for turning the carrying wheels so the front end of the device can be hitched to a tractor and the device guided by and trailed behind the tractor longitudinally for convenient transportation from field to field through ordinary openings in fences, over culverts and bridges and over highways.

An important object of the present invention is to provide means whereby one man can without assistance, conveniently change the wheels and hitch to a transporting position and back again to their operating position.

Further objects of the present invention are to divide the discs of which there may be as many as thirty, into preferably four or five separate gangs, each gang being independently spring held to a working depth under the control of the tractor operator and whereby all of the gangs can be raised and lowered from their operating and inoperating positions by means of a power lift. Each gang is attached to a tube which rotatably surrounds the main frame member so that the power lift and the manually operated depth control means for raising and lowering the discs are operated by turning this tube on the main frame member instead of raising or lowering the entire device for the purpose.

Novel features of the present invention are the means provided for turning the furrows, ground and rear carrying wheels from operating to transporting position or vice versa.

Another novel feature of the present invention is the means provided for vertically angling the rear carrying wheel by turning the tube to which the wheel is attached in the supplemental or rear frame member.

A novel feature of the present invention is the hitch and its connection to the front furrow wheel and the means whereby this hitch may be stacked on the frame of the device and the wheel supplied with a draw bar and turned to its transporting position.

To these and other useful ends my invention consists of parts, combinations of parts or their equivalents and mode of operation and means for changing the device for transporting as hereinafter described and claimed and shown in the accompanying drawings in which:

Fig. 4 is an elevational front end view of the front carrying wheel and its associated parts showing a fraction of the hitching device and a fraction of the main frame gang tube and main frame member, the wheel being shown in an operating position.

Fig. 5 is a view somewhat similar to Figure 4 but showing the wheel in a transporting position.

Figure 1:
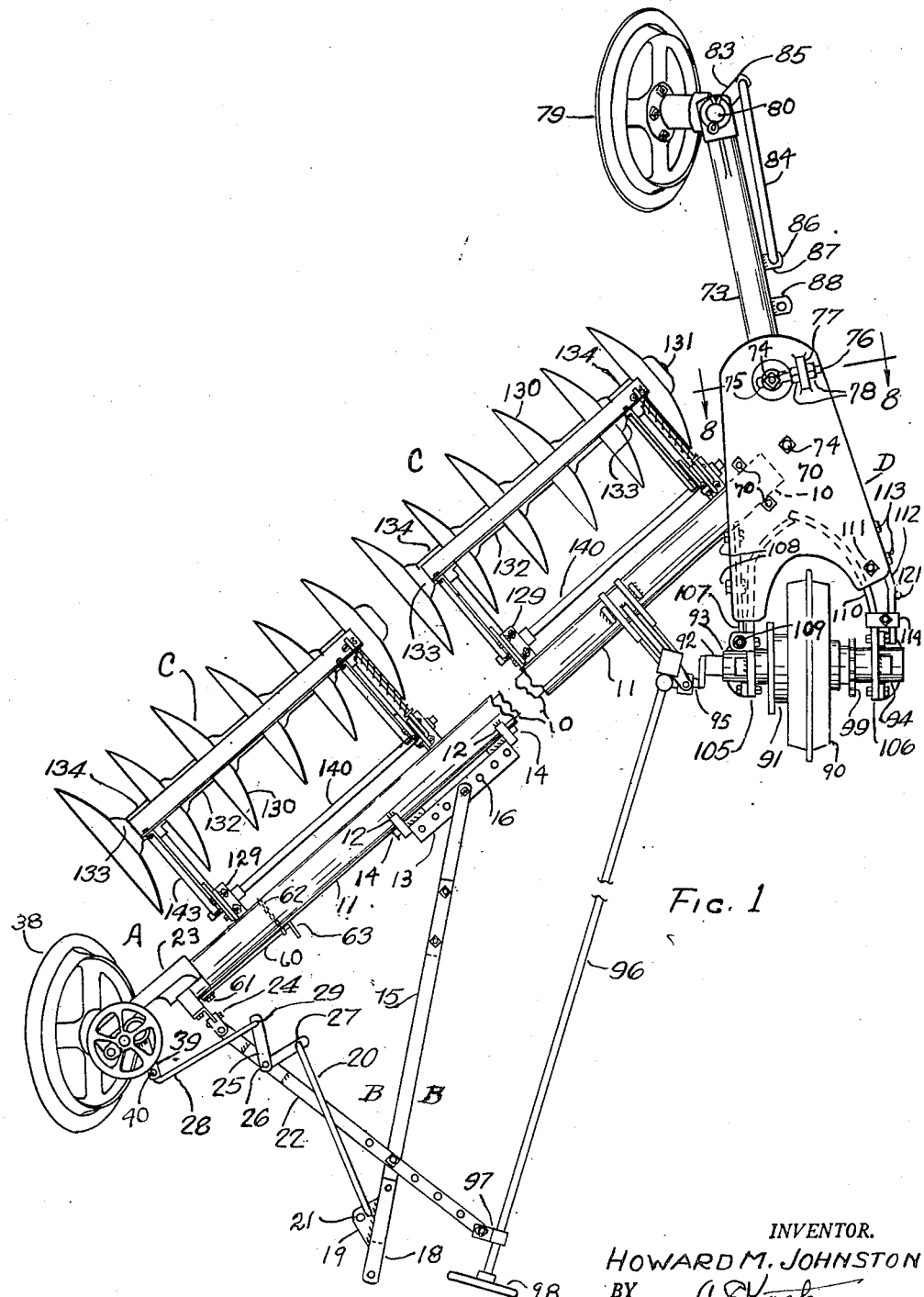
Fig. 1 is a top view illustrating my complete device with the three central gangs omitted and the main frame member, the frame tube and controlling shaft cut away accordingly.
Figure 2:
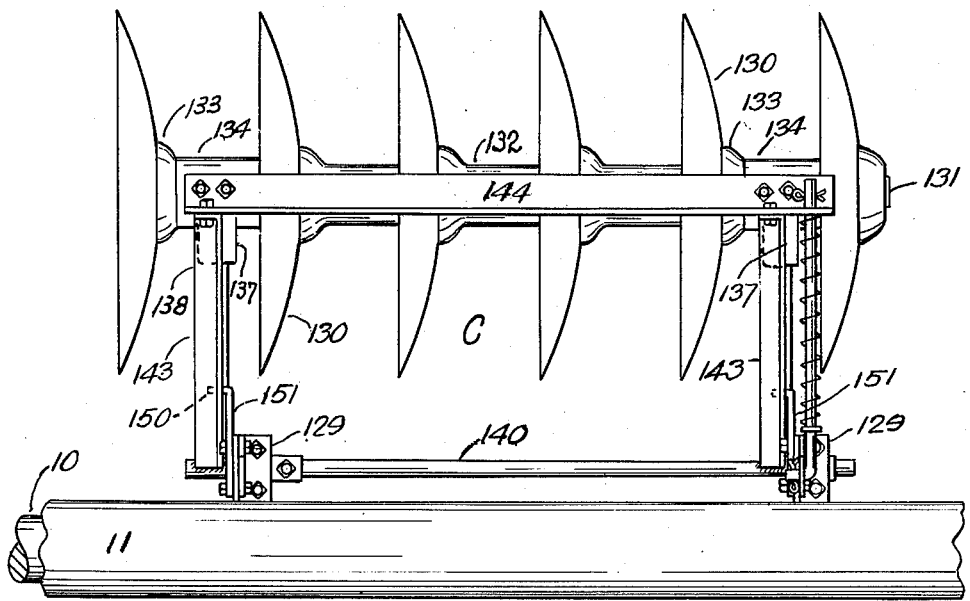
Fig. 2 is a top view of a disc gang shown attached to a fraction of the main frame tube.
Figure 3:
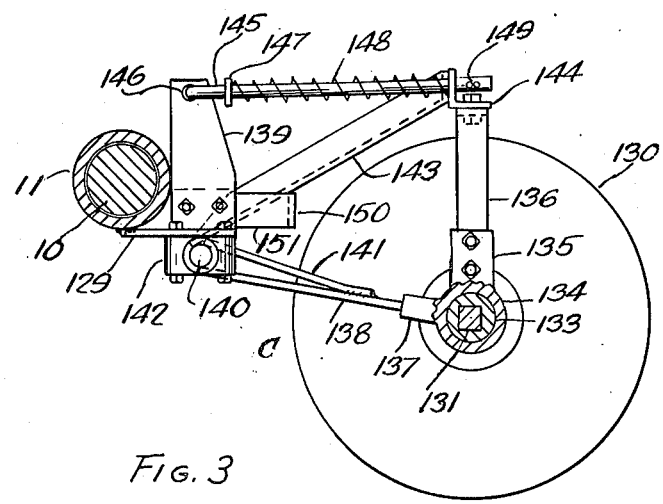
Fig. 3 is an end view of the device as shown in Figure 2.

In the drawings the front wheel carrying mechanism is designated in its entirety by reference character A. The hitch mechanism is designated in its entirety by reference character B. The gangs are each designated in their entireties by reference character C, the land side bracket or supplemental frame including the wheels and associate parts attached thereto are designated by reference character D.

As thus illustrated A and D are connected together by means of a main frame member or shaft 10, a gang tube 11 is rotatably mounted on shaft 10, the tube being positioned end wise by contact with members A and D.

Hitch B comprises brackets 12—12 which are welded to tube 11 having a hitch plate 13 therebetween and hinged to members 12 as at 14—14. A main hitch bar 15 is adapted to be connected at its rear end to any one of a series of holes 16 in member 13. Member 15 has pivotally attached thereto as at 17 a draft link 18, its front end being adapted to be attached to the draw bar of a tractor and having preferably secured thereto a plate 19 to which a link 20 is pivotally attached as at 21. Another draw bar link 22 is horizontally pivoted at its rear end to the front frame bracket 23 as at 24.

I provide a bell crank 25 which is pivoted to member 20 as at 26, link 20 being connected to one of the arms as at 27, the other arm being connected to a link 28 as at 29.

Front frame bracket 23 of member A is rigidly secured to main frame shaft 10. A bracket 35 is hinged to the outer end of member 23 as at 36 and having vertically rotatably mounted therein an axle post 37 to which the front carrying wheel 38 is rotatably mounted in the usual fashion. Post 37 has secured thereto a forwardly extending arm 39 to which link 28 is rotatably attached as at 40. Thus wheel 38 will be turned to the right or left in the direction draft link 18 is turned according to the direction the tractor takes.

Bracket 35 is turned anti-clockwise until arm 41 lays on bracket 23 and is held in this position by a bolt 42, thus to hold wheel 38 in an operating position as indicated in Figures 1 and 4. Axle post 37 has rotatably mounted thereon and near the top a bracket 43. A stabilizing pin 44 is secured to one end of this bracket and is slidably mounted in an extension 45 on member 35. A nut 46 is loosely inserted in an opening in member 35 (see Figure 5). A screw threaded shaft 47 extends freely through an opening in member 35 and is threaded into nut 46. Shaft 47 has a collar 48 on the under side of member 43 and another collar 49 which rests on the top of member 43. Shaft 47 has a hand wheel 50 secured to its upper end. Thus it will be seen that wheel 38 may be raised and lowered relative to bracket 23 by turning wheel 50.

When it is desired to turn wheel 38 straight ahead as in Figure 5, bolt 42 is loosened and bracket 35 is turned clockwise until an arm 53 lays on the rear side of member 23 and having a hole 54 which registers with bolt 42 which acts to secure member 53 to member 23.

It will be noted that washers and cotter pins 55—55 will permit member 43 to turn freely on post 37 but hold this member from moving end wise on post 37.

In order to make it convenient for one man to change wheel 38 from an operating to an inoperating position or vice versa I provide a post 60 which is hinged to bracket 23 as at 61. Generally this post is tied to tube 11 by means of a chain or wire 62 in the position shown in Figure 4. When it is desired to turn the wheel from an operating to an inoperating position the front end of the device is raised by operating wheel 50 until member 60 is in a vertical position as shown in Figure 5, member 60 having preferably a pad 63 on its lower end for contact with the earth, then wheel 50 is turned enough to raise wheel 38 off the ground at which time bracket 35 may be turned as already explained, to the position shown in Figure 5 for transporting. Then the wheel is lowered far enough to release member 60 which is again tied to member 11 as shown in Figure 4. When wheel 38 is turned to a transporting position, a special hitch bar 64 is horizontally hingedly secured to member 39, its front end being adapted to be attached to the tractor. To move wheel 38 to its operating position the operations just described, are reversed and member 60 again fastened in the position shown in Figure 4.

I will now describe member D.

Figure 6:
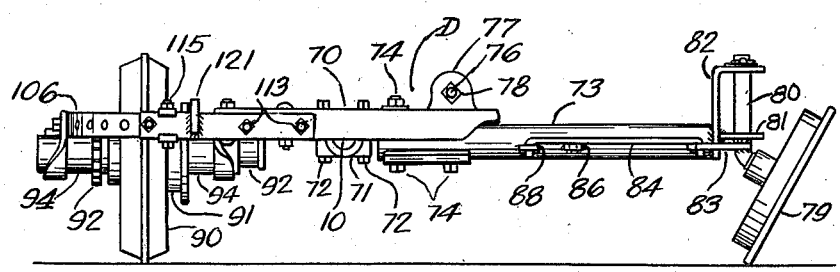
Fig. 6 is a land side end view of the device with the wheels turned in the position for transporting.
Figure 8:
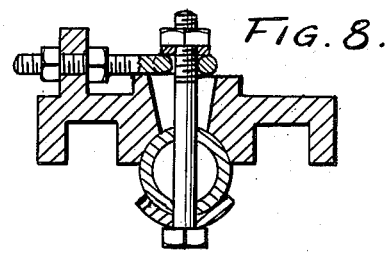
Fig. 8 is a sectional view of an enlarged drawing taken on line 8—8 of Figure 1.

This member comprises the supplemental frame or bracket 70 which is rigidly secured to the rear end of member 10 in any suitable manner, preferably by means of a cap 71 and bolts 72—72 (see Figures 1 and 6). A rearwardly extending tube 73 is secured to member 70 by means of bolts 74—74, the rear bolt being closely fitted in a hole in the tube and extending through a slot 75 is member 70. The rear bolt 74 (see figure 8) has an eye bolt 76 which extends loosely through a bracket 77 on member 70, the eye bolt having nuts 78 on opposite sides of member 77. Thus by loosening bolts 74 and manipulating nuts 78 tube 73 can be turned clockwise or anticlockwise for the purpose of adjusting the vertical angle of rear carrying wheel 79 which is rotatably mounted on an axle post 80, the post being rotatable mounted on brackets 81 and 82, the brackets being welded to tube 73. By scrutinizing Figure 8 it will be noted that a washer is positioned on bolt 74 and on top of eye bolt 76 so that when the nut is made taut, eye bolt 76 will be held firmly on member D.

It is desired to frequently move wheel 79 from an operating position as shown in Figure 1 to a transporting position as shown in Figure 6. To accomplish this, an arm 83 is preferably welded to post 80 and a link 84 is rotatably secured to arm 83 as at 85. A lug 86 is secured to tube 73 and is adapted to receive the front end of link 84 as at 87, for holding wheel 79 in its operating position. Another lug 88 is placed in a position to hold wheel 79 in a transporting position when link 84 is attached thereto as illustrated in Figure 6. Link 84 may, if desired be provided with a turn buckle for close adjustment of the operating position of wheel 79. There is not great weight on wheel 79 and therefore the operator can easily turn it from one position to the other.

A front ground wheel 90 is provided with a power lift clutch 91 and is rotatably mounted on a shaft 92 which extends through bearings 93 and 94, one side of the clutch being secured to the wheel and the other side being secured to shaft 92. The two members of the clutch have means for being locked together or released when a rope (not shown) which extends within reach of the operator, is pulled, the rear end of the rope being connected to the free end of a lever adapted to engage and disengage the clutch, the clutch being adapted to work on the one half turn principle, the design of which is too well known to require detail showing and description.

Shaft 92 has on its inner end a crank 95 which is connected indirectly to tube 11 similar to the connection of crank 60 to tube 10 in my issued Patent #2,426,354, August 26, 1947.

In the present design each of the disc gangs is raised or lowered simultaneously as in said issued patent, there being also provided in the present design means for manually controlling the depth of the disc gangs comprising a shaft 96 properly supported at its front end as at 97 and having a hand wheel 98 within easy reach of the operator of the tractor.

I provide a sprocket wheel 99 which is operatively connected to wheel 90 and used for driving a seed distributing box which may be mounted on the device.

I provide means for turning wheel 90 from an operating position to a transporting position or vice versa as follows:

Bearings 93 and 94 are mounted on the front ends of sub frame bars 105 and 106. These bars are connected together at their rear ends and lay flat under a corresponding part of member 70. I provide a bar 107 which is rigidly secured to the side flange of member 70 by means of bolts 108, the front end of this bar being hingedly connected to bar 105 as at 109. Bar 106 between bearing 94 and where it connects to bar 105, is shaped on a radius with hinge 109 as at 110 and is firmly held against the under surface of member 70 by means of a strap (not shown) and bolt 111. It is also anchored to member 70 by means of an arm 112 which is secured to a flange on the bottom of member 70 by means of bolts 113—113.

Figure 7:
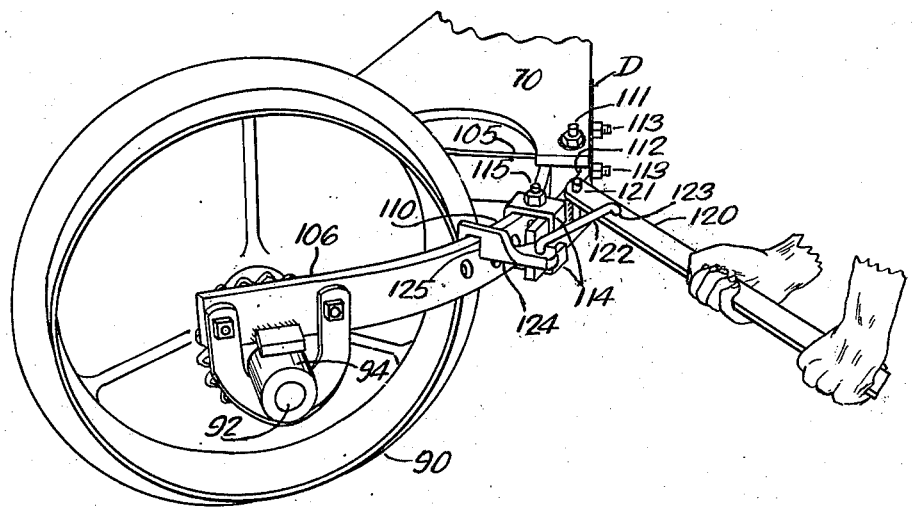
Fig. 7 is an enlarged view of the land side wheel and a fraction of its frame member illustrating the manner of moving this wheel to a transporting or to an operating position.

Bar 112 extends forwardly and inwardly as illustrated in Figures 1 and 7 and is anchored to member 106 by means of clips 114—114 and a bolt 115. Thus member 106 may be firmly anchored to member 70 when in either an operating or transporting position.

There is considerable weight on wheel 90, therefore I provide means whereby the operator without assistance can move wheel 90 from an operating to a transporting position or vice versa as follows:

A hand lever 120 is detachably hinged to a post 121 secured to member 112, the hand lever having a link 122 which is pivotally connected to lever 120 as at 123. The other end of link 122 is hingedly mounted to the outer end of a gripping member 124 having a slot 125 on its inner lower side which fits loosely over member 106 so it grips this member when link 122 is moved in either direction by lever 120. It will be seen that member 106 may be made free on member 70 and member 120 used by the operator to easily move wheel 90 without reducing the weight thereon. Clearly therefore the operator can easily and quickly move all of the carrying wheels to a transporting position or vice versa.

I will now describe members C and how they are connected to tube 11:

Each disc gang has preferably six discs 130 mounted on a shaft 131, the discs being spaced by means of sleeves 132 and bearing sleeves 133—133, bearing sleeves 133 being rotatably mounted in bearing housings 134 as is the custom in standard disc harrows. Housings 134 each have a projection 135 to which a post 136 is secured. These housings also preferably have forwardly extending projections 137 to which a draw link 138 is attached.

It will be understood that housings 134 may be of any standard design and connected to post 136 and draw links 138 in any standard disc harrow manner. Spaced brackets 129 are preferably made from L iron and suitably welded to tube 11. A post 139 is mounted on the vertical lip of member 129 as illustrated. Each draw link 138 is secured to a shaft 140 and reinforced by a brace 141 which is preferably electric welded to the shaft and to link 138. Thus each gang bearing is firmly secured to the shaft, the shaft being rotatably mounted in a pair of bearings 142—142 which are secured to the horizontal lip of member 129, thus leaving the disc gang free to move vertically.

A brace 143 is secured to shaft 140 and extends upwardly and rearwardly, the rear end being secured to an L iron 144. This L iron is secured to a pair of posts 136, thus forming a disc gang frame. A bar 145 is hinged to member 139 as at 146 and slidably extends through openings in the vertical lip of L irons 144. Each bar 145 is provided with a collar 147 and a push spring 148, each bar having a stop in the form of preferably a cotter pin 149.

Thus a downward pressure is exerted on the gang frame, this downward movement being limited by the L-shaped end 150 of a stop member 151 which is also secured to the vertical lip of L iron 144. Thus it will be seen that the rear end of the disc gang frames are limited in their downward movement relative to tube 11 but may raise by overcoming spring or springs 148. Therefore each gang is spring held to a desired depth but may individually ride over serious obstructions.

It will be seen that applicant has evolved a disc tiller having all of the characteristics recited in the preamble of this specification.

Clearly, detailed changes may be made in the design shown without departing from the spirit and scope of my invention as recited in the appended claims.

Having thus shown and described my invention, I claim:

1. An earth tilling device of the character described comprising, a shaft forming a main frame, a bracket secured to the forward end of said shaft and having a guiding and carrying wheel, another bracket secured to the rear end of said shaft intermediate its ends and having mounted on its front and rear ends carrying wheels, a tube rotatably mounted on said shaft and occupying the space between said brackets, a forwardly extending hitch member secured to said main frame, a draw link vertically pivoted at its rear end to the front end of said hitch member, its front end adapted to be pivotally attached to a tractor, said guiding and carrying wheel being rotatably mounted on an axle having an upwardly extending post rotatably mounted on said bracket, a forwardly extending guide plate rigidly secured to said axle and post, operating link connections between the forward end of said guide plate and said draw link for guiding said guiding and carrying wheel, a number of disc frames each having a number of discs rotatably mounted on their rear ends, the front ends of the disc frames being hinged to said tube, front and rear carrying wheels mounted on said rearmost bracket, the rear wheel being rotatably mounted on an axle having a vertical extension post rotatably mounted on the rear end of said rearmost bracket and having means whereby the direction of travel relative to said shaft may be adjusted manually, said front carrying wheel being rotatably mounted on said rearmost bracket and having associated therewith a half turn power clutch having a crank, an operating connection between said crank and tube, whereby said tube may be oscillatingly turned by said crank, manually operated means associated with said operating connection between the crank and tube for turning the tube independent of said power lift.

2. A device as recited in claim 1 including, the mounting of the front wheel to said rearmost bracket comprising a supplemental frame and being vertically hinged to the rearmost bracket adjacent said crank, means for manually fixing said supplemental frame in an operating and a trailing position and without disconnecting the operating connection between said crank and tube.

3. A device as recited in claim 1 including, said operating connection to said guide plate and said forwardly extending hitch member being detachable, a separate draw bar link adapted to be rigidly secured at its rear end to said guide plate and at its front end direct to a tractor, said forward carrying wheel mounting to said rearmost bracket, comprising a supplemental frame being vertically hingedly secured to the rearmost bracket adjacent said crank and means whereby the supplemental frame may be manually turned and secured in a position to hold its carrying wheel in an operating position or in a position substantially parallel to said shaft for trailing, the connection of said rear wheel to the other bracket having means whereby the wheel may be turned to a position substantially parallel to said shaft for trailing.

4. An earth tilling device of the character described comprising, a main frame having a bracket at its forward end, another bracket vertically hinged at one end to said first bracket, a guiding and carrying wheel rotatably mounted on an axle having a post vertically rotatably mounted on the free end of said other bracket, rear carrying wheels rotatably mounted on the rear end of said frame, a number of discs mounted on said frame, manual means for raising and lowering the discs relative to the frame, a forwardly extending hitch member detachably secured to said frame, a draw link vertically hinged at its rear end to the front end of said hitch member, its front end adapted to be pivotally attached to a tractor, said rearmost bracket being adapted to be swung rearwardly on its pivot and locked for holding its guiding and carrying wheel in an operating position and adapted to be swung forwardly and locked for holding the guiding and carrying wheel in a trailing position, a forwardly extending guide plate rigidly secured to said axle and post, operating link connections between the forward end of said guide plate and said draw link for guiding said guiding and carrying wheel when held in its operating position, said operating connection to said guide plate being detachable, a separate detachable draw bar adapted to be rigidly connected at its rear end to said guide plate, its forward end being adapted to be connected to a tractor for trailing the device, means for adjusting said rear carrying wheels for trailing the device.

5. A disc tiller of the character described comprising, a main frame having one forward and a pair of rear carrying wheels, a hitch member having a link pivotally connected to the forward end thereof and having an operating connection to said front wheel for controlling its direction of travel, the rear end of said main frame having secured thereto a rearwardly extending tube, the rear carrying wheel of said pair of wheels being rotatably mounted on a generally vertically arranged post, means for holding said last rear carrying wheel in a predetermined position, the fastening of said tube to the rear frame comprising two bolts one bolt extending loosely through the tube and through the frame, the other bolt extending snugly through the tube and through a transverse slot in the frame, an eye bolt on said other bolt adapted to act as a washer, a projection on said frame near one end of said slot having an opening through which said eye bolt extends, nuts on said eye bolt positioned on opposite sides of said projection whereby when the tube bolts are loosened said eye bolt nuts may be manipulated for turning the tube relative to the frame.

HOWARD M. JOHNSTON.

REFERENCES CITED

The following references are of record in the file of this patent:

UNITED STATES PATENTS

| Number | Name | Date |
| --- | --- | --- |
| 1,329,375 | Collins | Feb. 3, 1920 |
| 1,921,480 | Ray | Aug. 8, 1933 |
| 1,944,674 | Silver | Jan. 23, 1934 |
| 2,426,354 | Johnston | Aug. 26, 1947 |